(12) United States Patent
Okada et al.

(10) Patent No.: US 6,338,679 B1
(45) Date of Patent: Jan. 15, 2002

(54) PORTABLE GAME MACHINE

(75) Inventors: Satoru Okada; Hitoshi Nakai, both of Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/542,247

(22) Filed: Apr. 3, 2000

(30) Foreign Application Priority Data

Nov. 19, 1999 (JP) .......................................... 11-330287

(51) Int. Cl.$^7$ ................................................ A63F 9/22
(52) U.S. Cl. ............................ 463/31; 463/30; 463/43; 463/44
(58) Field of Search .......................... 463/30–31, 43–44

(56) References Cited

U.S. PATENT DOCUMENTS

| | | | | |
|---|---|---|---|---|
| 5,184,830 A | * | 2/1993 | Okada et al. ................ | 273/433 |
| 5,464,990 A | * | 11/1995 | Shiratsuki et al. ............ | 257/40 |
| 5,666,173 A | * | 9/1997 | Mase et al. ................... | 349/61 |
| 5,926,438 A | * | 7/1999 | Saito .......................... | 367/111 |
| 5,953,090 A | * | 9/1999 | Ozeki et al. ................. | 349/121 |
| 6,042,478 A | * | 3/2000 | Ng ............................. | 463/44 |

* cited by examiner

*Primary Examiner*—Valencia Martin-Wallace
*Assistant Examiner*—Carmen D. White
(74) *Attorney, Agent, or Firm*—Nixon & Vanderhye P.C.

(57) ABSTRACT

To a CPU 10 in a portable game machine 1, a temperature detector 5 and a voltage detector 6 are connected. The temperature detector 5 detects an operating temperature of an LCD 4, and the voltage detector 6 detects a power supply voltage supplied by the LCD 4. Following a program stored in on-chip ROM 13, the CPU 10 calculates a driving voltage for the LCD 4 based on the detected temperature and voltage. At the same time, the CPU 10 selects, from among a plurality of character data items which are previously provided, at least one character data item and writes the selected data item into display RAM 11. The detected temperature and voltage each correspond to the character's age and action. As a result, correct colors can be displayed even in a case where the LCD 4 is adopting an Electrically Controlled Birefringence method. Further the character selected based on the temperature and voltage is displayed on the LCD 4.

8 Claims, 13 Drawing Sheets

FIG. 10

| TRUE TEMPATURE VALUE Ttrue | TRUE VOLTAGE VALUE Vtrue | DETECTED TEMPATURE VALUE t | DETECTED VOLTAGE VALUE v | DRIVING VOLTAGE BIAS (HEXADECIMAL NOTATION) |
|---|---|---|---|---|
| 0 | 2.7 | 27 | 2 | 39 |
| 0 | 2.8 | 27 | 7 | 34 |
| 0 | 2.9 | 26 | 12 | 2F |
| 0 | 3.0 | 26 | 17 | 2B |
| 0 | 3.1 | 26 | 22 | 28 |
| 0 | 3.2 | 26 | 26 | 25 |
| 10 | 2.7 | 39 | 3 | 35 |
| 10 | 2.8 | 39 | 8 | 30 |
| 10 | 2.9 | 39 | 13 | 2D |
| 10 | 3.0 | 39 | 18 | 28 |
| 10 | 3.1 | 39 | 23 | 23 |
| 10 | 3.2 | 38 | 28 | 1F |
| 20 | 2.7 | 54 | 4 | 33 |
| 20 | 2.8 | 54 | 9 | 2E |
| 20 | 2.9 | 53 | 14 | 2A |
| 20 | 3.0 | 53 | 19 | 25 |
| 20 | 3.1 | 53 | 24 | 20 |
| 20 | 3.2 | 53 | 29 | 1C |
| 30 | 2.7 | 69 | 5 | 2D |
| 30 | 2.8 | 69 | 10 | 28 |
| 30 | 2.9 | 69 | 15 | 23 |
| 30 | 3.0 | 69 | 20 | 1F |
| 30 | 3.1 | 69 | 26 | 1A |
| 30 | 3.2 | 69 | 30 | 16 |
| 40 | 2.7 | 82 | 6 | 28 |
| 40 | 2.8 | 83 | 11 | 23 |
| 40 | 2.9 | 84 | 17 | 1E |
| 40 | 3.0 | 84 | 22 | 1A |
| 40 | 3.1 | 84 | 27 | 14 |
| 40 | 3.2 | 85 | 32 | 10 |

| VOLTAGE | AGE |
|---|---|
| EQUAL TO OR HIGHER THAN 3.1V | CHILDHOOD |
| 3.0V TO 3.1V | BOYHOOD/GIRLHOOD |
| LOWER THAN 3.0V | YOUTH |

| TEMPERATURE | EXAMPLE OF ACTION |
|---|---|
| EQUAL TO OR HIGHER THAN 27°C | SWIMMING<br>VIEWING FIREWORKS<br>EATING SNOW CONE |
| 8°C TO 27°C | PLAYING RUNNING AROUND<br>PLAYING WITH TOY<br>EATING MEAL |
| LOWER THAN 8°C | SKIING<br>MAKING SNOWMAN<br>DRINKING HOT CHOCOLATE AT FIREPLACE |

FIG. 13

| TEMPERATURE VOLTAGE | 0°C | 25°C | 40°C |
|---|---|---|---|
| LOW ↓ ↓ ↓ HIGH | ↓ GREEN ↓ PURPLE ↓ YELLOW | ↓ GREEN ↓ PURPLE ↓ YELLOW ↓ | GREEN ↓ PURPLE ↓ YELLOW ↓ |

PORTABLE GAME MACHINE

BACKGROUND OF THE INVENTION

1. Field of the Invention

The present invention relates to portable game machines performing display on liquid crystal displays (LCDs), and more particularly to a portable game machine, in which an operating temperature and a power supply voltage are detected for adjusting a driving voltage for an LCD.

2. Description of the Background Art

LCDs which display screens with low power consumption are suitable display devices for portable game machines. Recently, as a type of LCD capable of color display, an LCD of Electrically Controlled Birefringence method (hereinafter referred to as ECB) has become commercially practical. The ECB-LCD performs color display by utilizing a variation of birefringence characteristics in a liquid crystal layer. Such variation is caused by changing a tilt angle of liquid crystal molecules by changing a voltage applied to the liquid crystal layer. Since the ECB-LCD does not require a backlight, color display can be realized with low power consumption.

On the other hand, the ECB-LCD has a characteristic that the display color varies depending on an operating temperature. This is because the birefringence characteristic of liquid crystal layer changes as the operating temperature changes. FIG. 13 shows the exemplary relation between temperatures/voltages and display colors in the ECB-LCD. As the voltage increases, the display color of ECB-LCD changes from green to purple, then to yellow, for example. The display color of the ECB-LCD also varies depending on the variation in operating temperature.

In the portable game machine adopting the ECB-LCD, it is also required to correctly display predetermined colors regardless of the operating temperature variation. For example, in a portable game machine where characters appear in a game played therewith, an LCD is required to display the characters with respective predetermined colors. The operating temperature of the portable game machine, however, varies depending on use conditions, and accordingly, the display color of ECB-LCD varies. Therefore, in order to achieve correct color display on the ECB-LCD, the operating temperature of the LCD is detected and the driving voltage therefor is adjusted based on the detected temperature value.

Further, in the portable game machine, the driving voltage for the LCD is generated by raising a power supply voltage supplied by a battery. The display color of the ECB-LCD is therefore vulnerable to power supply voltage fluctuations. It is thus required to detect the power supply voltage, as well, and adjust the driving voltage for the LCD based on the detected voltage value in order to correctly display colors on the ECB-LCD.

As stated above, in the portable game machine adopting the ECB-LCD, the operating temperature of the LCD and the power supply voltage should be detected for correct color display. The detected temperature and voltage are utilized to control the display color on the ECB-LCD but not to control the contents of games.

SUMMARY OF THE INVENTION

Therefore, an object of the present invention is to provide a portable game machine with more fun by reflecting, to the contents of a game, a temperature and a voltage which are detected to control a display color on an LCD .

The present invention has the following features to achieve the object above.

A first aspect of the present invention is directed to a portable game machine performing display on an LCD, comprising:

the LCD for displaying a character data item;

an LCD driving part for driving the LCD;

a temperature detection part for detecting an operating temperature of the LCD;

a voltage detection part for detecting a power supply voltage being supplied;

a program storage part for storing a program;

a character data storage part for storing the character data item; and a control part for calculating, following the program stored in the program storage part, a driving voltage in the LCD driving part based on the temperature detected by the temperature detection part and the voltage detected by the voltage detection part, and adjusting the driving voltage so that at least a part of the character data item is displayed with a predetermined color.

As described above, in the first aspect, the driving voltage for the LCD is adjusted based on the detected temperature and voltage, and a part of the character data item is displayed with the predetermined color, thereby enabling the display of a character on the LCD with the color unique thereto.

The character data item may be set with predetermined colors on each dot basis, and the driving voltage in the LCD driving part may be so controlled that the predetermined colors are displayed on the dot basis based on the detected temperature and voltage. Alternatively, a plurality of character data items may be stored and a character data item selected therefrom based on the detected temperature and voltage may be displayed on the LCD. In such case, each of the character data items corresponds to at least one of a temperature value and a voltage value, and is selected based on the detected temperature and voltage. By reflecting the detected temperature and voltage to the contents of a game and to the selection of a character, the game becomes more fun and also the status of the game machine can be easily known.

Also, a sound storage part may be further provided, and a sound data item selected based on the detected temperature and voltage may be outputted. This also increases fun of the game. Furthermore, the program storage part, the character data storage part, and the sound data storage part may be structured as being detachable from the portable game machine. Thereby, various games can be played with the same game machine only by changing the recording mediums.

A second aspect of the present invention is directed to a portable game machine performing display on an LCD, comprising:

the LCD on which a display color varies depending on a temperature and a voltage;

an LCD driving part for driving the LCD;

a temperature detection part for detecting an operating temperature of the LCD;

a voltage detection part for detecting a power supply voltage being supplied;

a character data storage part for storing a character data item for a game display; and a control part for reading the character data item stored in the character data storage part and controlling a driving voltage in the LCD driving part based on the temperature detected by the temperature detection part and the voltage detected by the voltage detection part so that the character data item is displayed on the LCD with at least a part of the character data item changed by color.

As described above, in the second aspect, the driving voltage for the LCD is adjusted based on the detected temperature and voltage, and a character is displayed with at least a part of the character being changed by color, thereby enabling correct color display even on the LCD on which the display color varies depending on a temperature and a voltage. At the same time, by reflecting the detected temperature and voltage to the contents of a game and the display colors, the game becomes more fun.

A plurality of the character data items may be set with predetermined colors on a dot basis, and the driving voltage may be so controlled, based on the detected temperature and the detected voltage, that each dot of the character becomes the predetermined color.

These and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a diagram showing the exemplary relation between temperatures/voltages and driving voltages for an LCD in the portable game machine according to the embodiment of the present invention;

FIG. 13 is a diagram showing the relation between temperatures/voltages and display colors in an Electrically Controlled Birefringence method LCD.

DESCRIPTION OF THE PREFERRED EMBODIMENT

Figure 1:
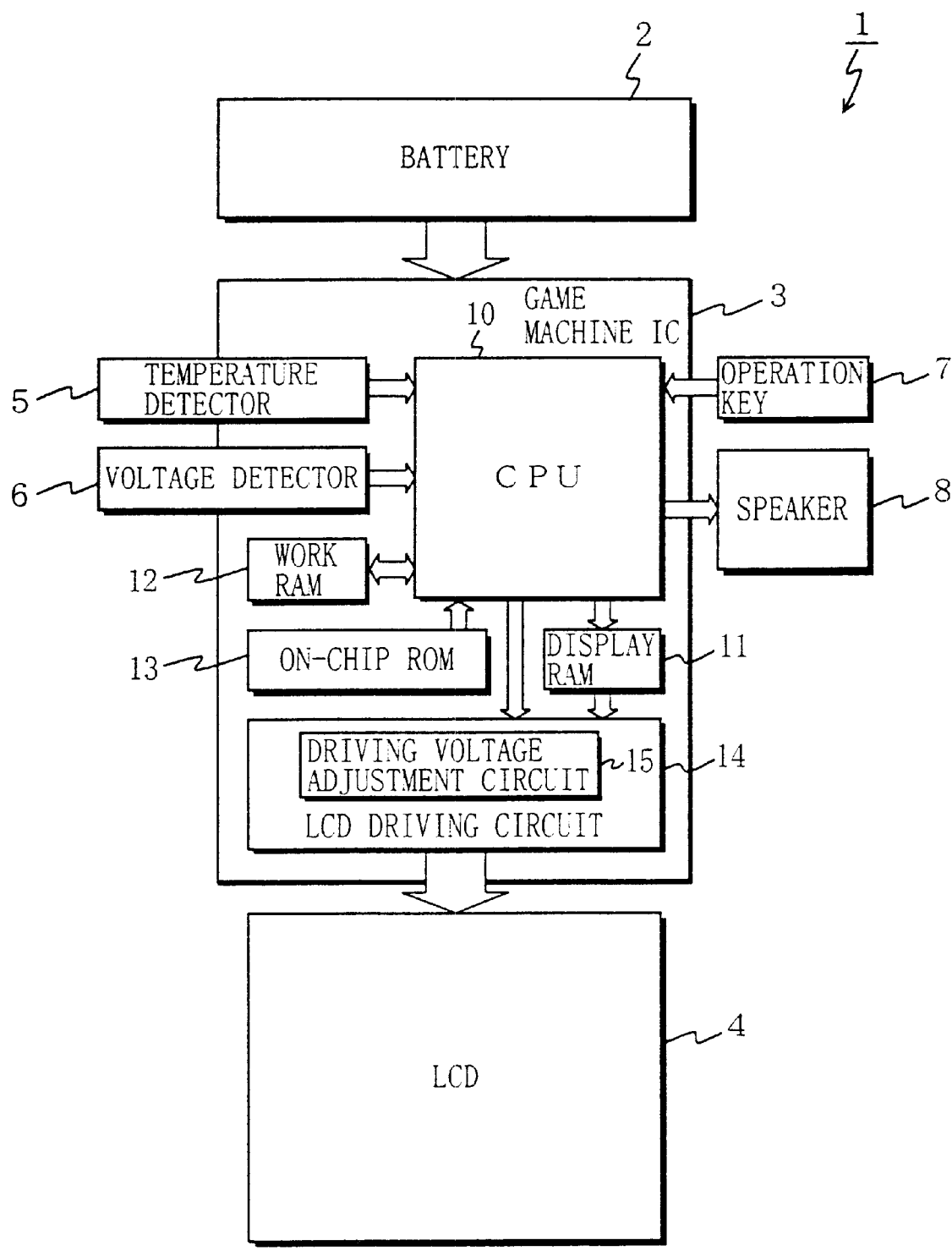
FIG. 1 is a block diagram showing the structure of a portable game machine according to one embodiment of the present invention.

Described below is a portable game machine according to one embodiment of the present invention. FIG. 1 is a block diagram showing the structure of a portable game machine 1 according to the embodiment of the present invention. In FIG. 1, the portable game machine 1 includes a battery 2, a game machine IC 3, an LCD 4, a temperature detector 5, a voltage detector 6, an operation key 7, and a speaker 8. The game machine IC 3 integrates functions necessary for the portable game machine 1 thereon, and includes a CPU 10, display RAM 11, work RAM 12, on-chip ROM 13, and an LCD driving circuit 14. The temperature detector 5 and the voltage detector 6 are both configured by respective circuits in the game machine IC 3 and external components.

The battery 2 supplies the portable game machine with a power supply voltage. Following a program stored in the on-chip ROM 13, the CPU 10 writes image data into the display RAM 11, receives key inputs from the operation key 7, and outputs sound from the speaker 8. The LCD 4 is an ECB-LCD performing multi-colored display, and displays image data including characters, graphics, images, and the like. The LCD driving circuit 14 reads the image data written into the display RAM 11 and drives the LCD 4. Accordingly, the display data generated by the CPU 10 is displayed on the LCD 4. A driving voltage for the LCD 4 is generated by raising the power supply voltage supplied by the battery 2 in the LCD driving circuit 14. The CPU 10 controls a driving voltage adjustment circuit 15 in the LCD driving circuit 14 to adjust the driving voltage for the LCD 4. The LCD driving circuit 14 is so configured that applied voltages can be adjusted on each dot or character size basis. Specifically, the LCD driving circuit 14 includes a plurality of drivers corresponding to each dot for setting the applied voltage on the dot basis. Note that the portable game machine 1 may be structured by a detachable ROM 13 instead of the on-chip ROM 13.

Figure 2:
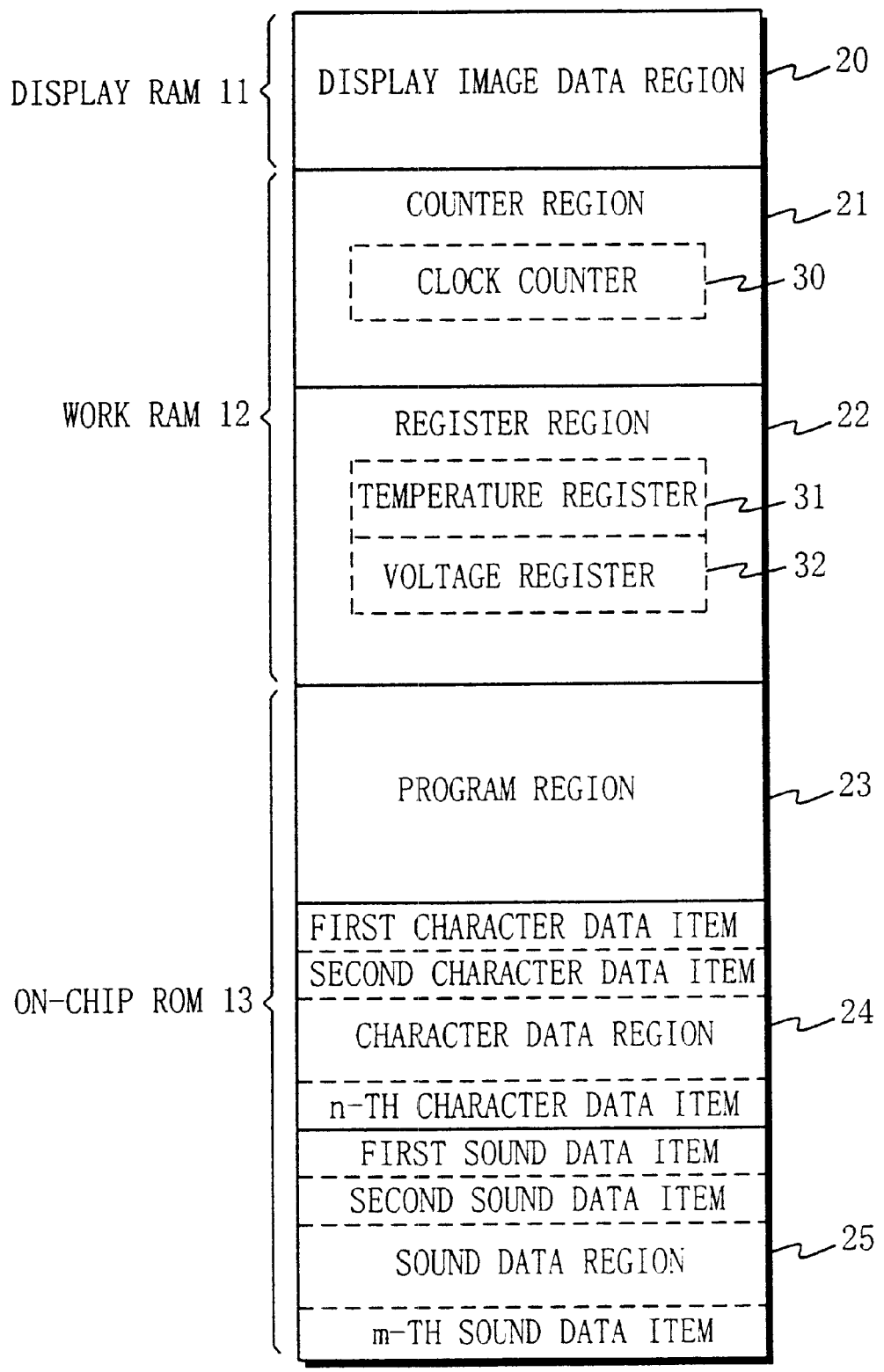
FIG. 2 is a memory map in the portable game machine according to the embodiment of the present invention.

FIG. 2 is a memory map in the portable game machine 1 according to the present embodiment. The CPU 10 is accessible to the display RAM 11, the work RAM 12 and the on-chip ROM 13. The display RAM 11 is the RAM for display on the LCD 4 and includes a display image data region 20 which stores display screens. The display RAM 11 is not limited to the one storing image data corresponding to the dots (pixels) of the LCD 4 (so-called bit map system) but may also be the one storing character codes for characters to be displayed on respective squares which are two-dimensionally aligned on the display (so-called text-based system). The work RAM 12 stores variables for the program, and includes a counter region 21 and a register region 22. In the counter region 21, a clock counter 30 is provided for storing clock information. In the register region 22, a temperature register 31 storing a temperature value and a voltage register storing a voltage value are provided.

The on-chip ROM 13 includes a program region 23, a character data region 24, and a sound data region 25. The program region 23 stores the program executed by the CPU 10, and the character data region 24 stores a plurality of character data items to be displayed on the LCD 4. In such character data items, color data (e.g. green, purple, or yellow as shown in the above described FIG. 13) enabling coloring on the dot basis is set or stored, or the character codes are stored. For each character data item, a pattern of the character is stored in correspondence with the voltage and/or the temperature, as shown in later described FIGS. 11a to 11c. In the sound data region 25, a plurality of sound data items to be outputted from the speaker 8 are stored in correspondence with the voltage and/or the temperature.

Figure 3A:
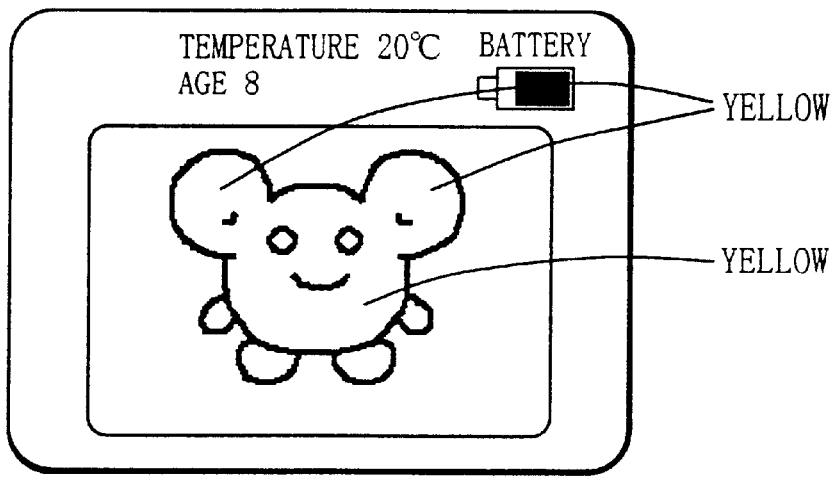
FIGS. 3a to 3c are exemplary display screens on the portable game machine according to the embodiment of the present invention.
Figure 3B:
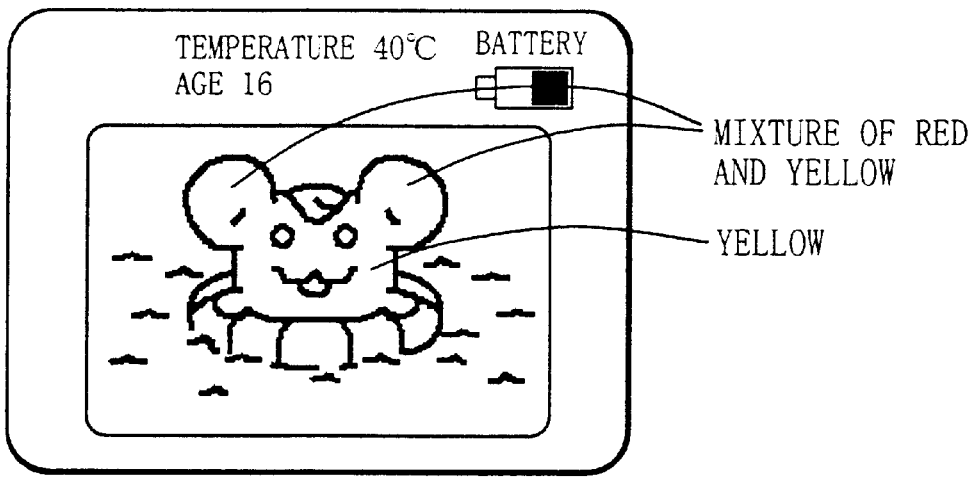
Figure 3C:
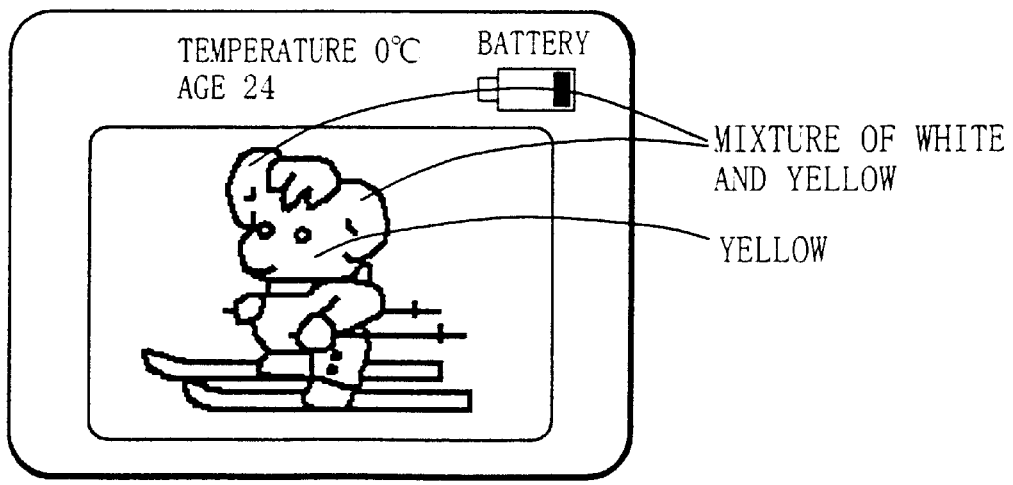

FIGS. 3a to 3c are exemplary display screens of the portable game machine 1 according to the present embodiment. The portable game machine 1 selects an action and status of the character who appears based on an input from the operation key 7, and displays, as shown in FIGS. 3a to 3a, any one of character data items on the LCD 4. On the LCD 4, the character and the outline thereof are displayed with yellow and black, respectively, while the color of the ears of the character varies depending on a temperature value detected by the temperature detector 5. For example, the color of the ears are assumed to be yellow in FIG. 3a, a mixture of red and yellow in FIG. 3b, and a mixture of white and yellow in FIG. 3c. In order to correctly display these colors on the LCD 4 without being affected by the operating temperature of the LCD 4 and the power supply voltage supplied by the battery 2, the CPU 10 selects arbitrary drivers in the LCD driving circuit 14, and adjusts the driving voltage for the LCD 4 on a part-of-character basis or a dot basis. The detail of the adjustment is described below.

Figure 4:
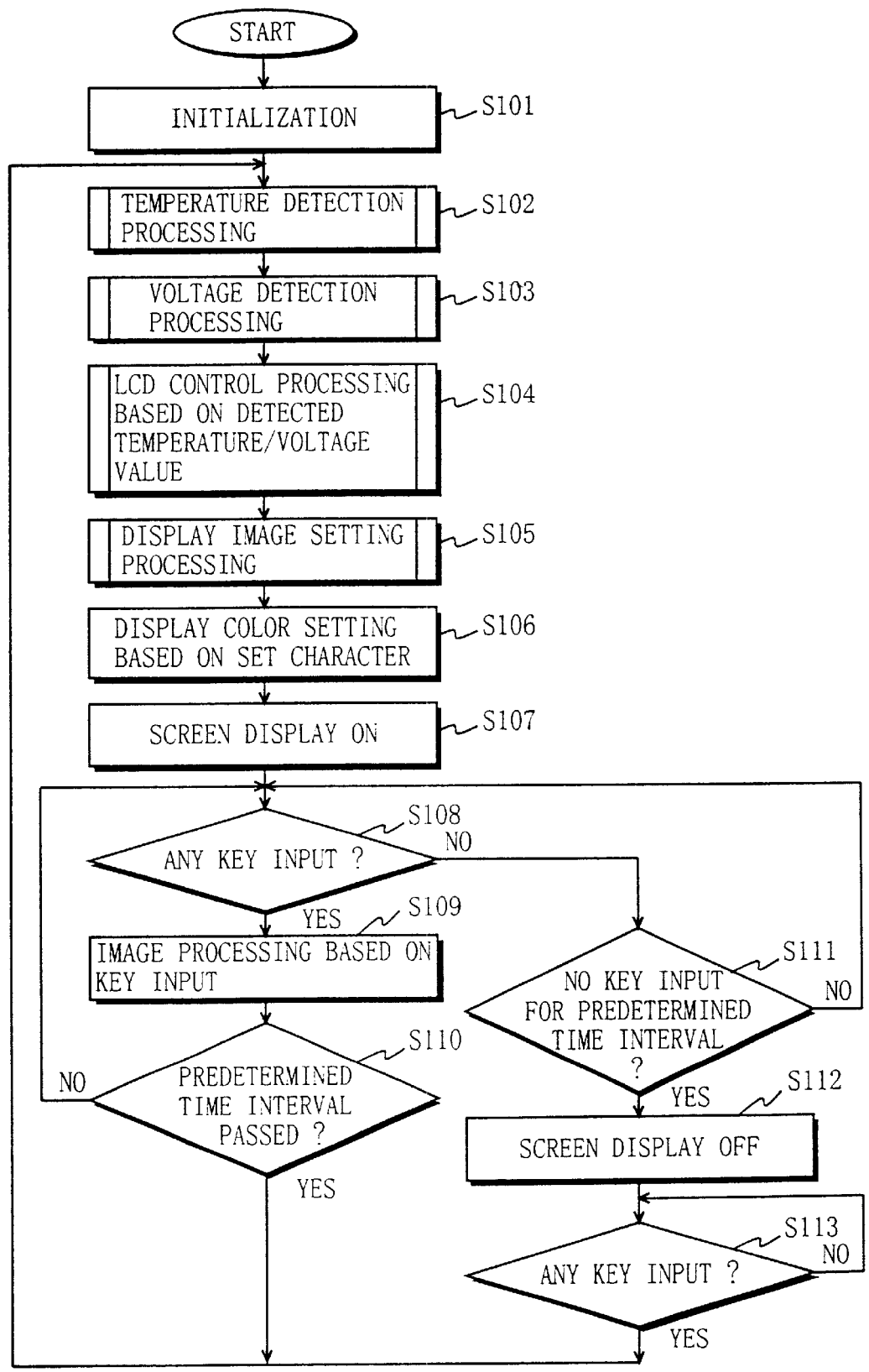
FIG. 4 is a main flowchart of the portable game machine according to the embodiment of the present invention.

FIG. 4 is a main flowchart showing an operation of the CPU 10 in the portable game machine 1 according to the present embodiment. The CPU 10, after initialization (step S101), repeats procedures in steps S102 to S113. That is, the CPU 10 first sequentially executes four subroutines of : temperature detection processing by the temperature detector 5 (step S102); voltage detection processing by the voltage detector 6 (step S103); LCD control processing for adjusting the driving voltage for the LCD based on the detected temperature and voltage (step S104); and display image setting processing for setting a display image based on the detected temperature and voltage (step S105). Next, the CPU 10 sets display colors based on the character set in the display image setting processing (step S106), and displays the screen (step S107). Thereafter, the CPU 10 detects a key input (step S108) and repeats image processing based on the key input (step S109). After repeating the processing for a predetermined time interval, the procedure returns to step S102 (step S110). In case of not detecting a key input for a predetermined time interval (step S111), the CPU 10 turns the display screen off and puts itself to a standby state (step S112). In such case, the CPU 10 returns to step S102 at the time of detecting the next key input (step S113). Consequently, the portable game machine 1 detects the operating temperature of the LCD 4 and the power supply voltage supplied by the battery 2 after every predetermined time interval. The portable game machine 1 then drives the LCD 4 by the voltage corresponding to the detected values, and also switches the display screen on the LCD based on the detected values.

Figure 5:
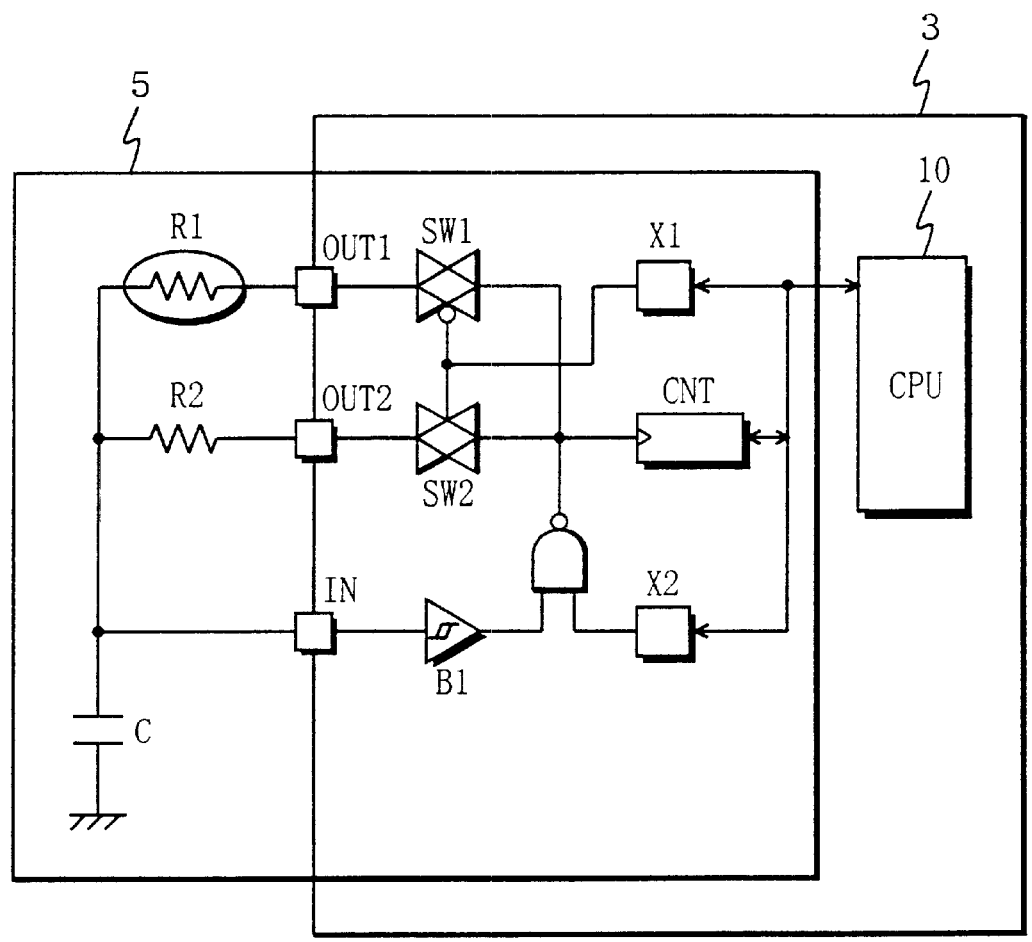
FIG. 5 is a circuitry diagram of a temperature detector in the portable game machine according to the embodiment of the present invention.

Described next below is the four subroutines included in the flowchart shown in FIG. 4. First, by referring to FIGS. 5 and 6, the temperature detection processing as being a first subroutine is described. FIG. 5 is a circuitry diagram showing the detail of the temperature detector 5 in the portable game machine 1 of the embodiment. The temperature detector 5 is structured by a thermistor R1, a reference resistor R2, and a capacitor C which are externally attached to the game machine IC 3, and an internal circuit of the game machine IC 3. The thermistor R1 is placed adjacently to the LCD 4. The CPU 10 writes values into registers X1 and X2, and initializes a counter CNT and reads a count value therefrom.

When the CPU 10 writes values "0" and "1" into registers X1 and X2, respectively, a switch SW1 turns to ON state, and thereby an oscillation circuit including the thermistor R1 and the capacitor C (hereinafter referred to as "thermistor R1-oscillation circuit") is formed. When the CPU 10 writes value "1" into both of the registers X1 and X2, a switch SW2 turns to ON state, and thereby an oscillation circuit including the reference resistor R2 and the capacitor C (hereinafter referred to as "reference resistor R2-oscillation circuit") is formed. Each oscillation circuit is made to operate by the CPU 10 only for a predetermined period, and the counter CNT counts a number of times of signal transition in each oscillation circuit during each period. As the operating temperature of the LCD 4 varies, the resistance value of the thermistor R1 also varies, and accordingly, the count value counted by operating the thermistor R1-oscillation circuit also varies. It is therefore possible to detect the temperature by obtaining respective count values for two oscillation circuits in the temperature detector 5, and then processing two count values in the CPU 10.

Figure 6:
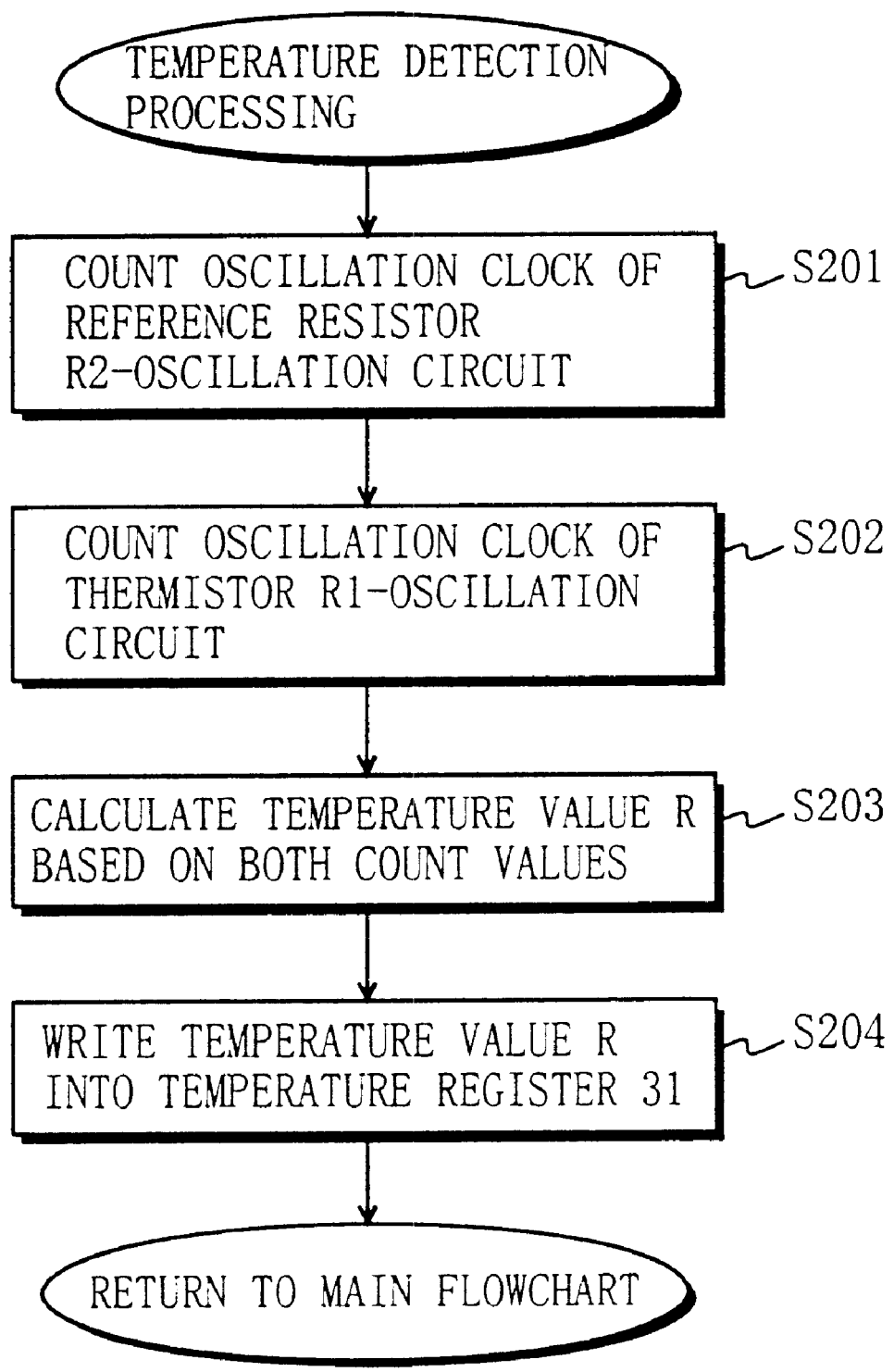
FIG. 6 is a flowchart of a temperature detection processing subroutine in the portable game machine according to the embodiment of the present invention.

FIG. 6 is a flowchart of the temperature detection processing subroutine in the portable game machine 1 according to the present embodiment. The CPU 10 first obtains a count value F2 counted for the reference resistor R2-oscillation circuit (step S201) and then a count value F1 counted for the thermistor R1-oscillation circuit (step S202). The CPU 10 calculates a detected temperature value R by the following equation (1) (step S203), and writes the calculated value R into the temperature register 31 (step S204).

$$R = F2/F1 \tag{1}$$

Note that the value in the temperature register 31 is not the temperature value itself but has one-to-one correspondence therewith.

Figure 7:
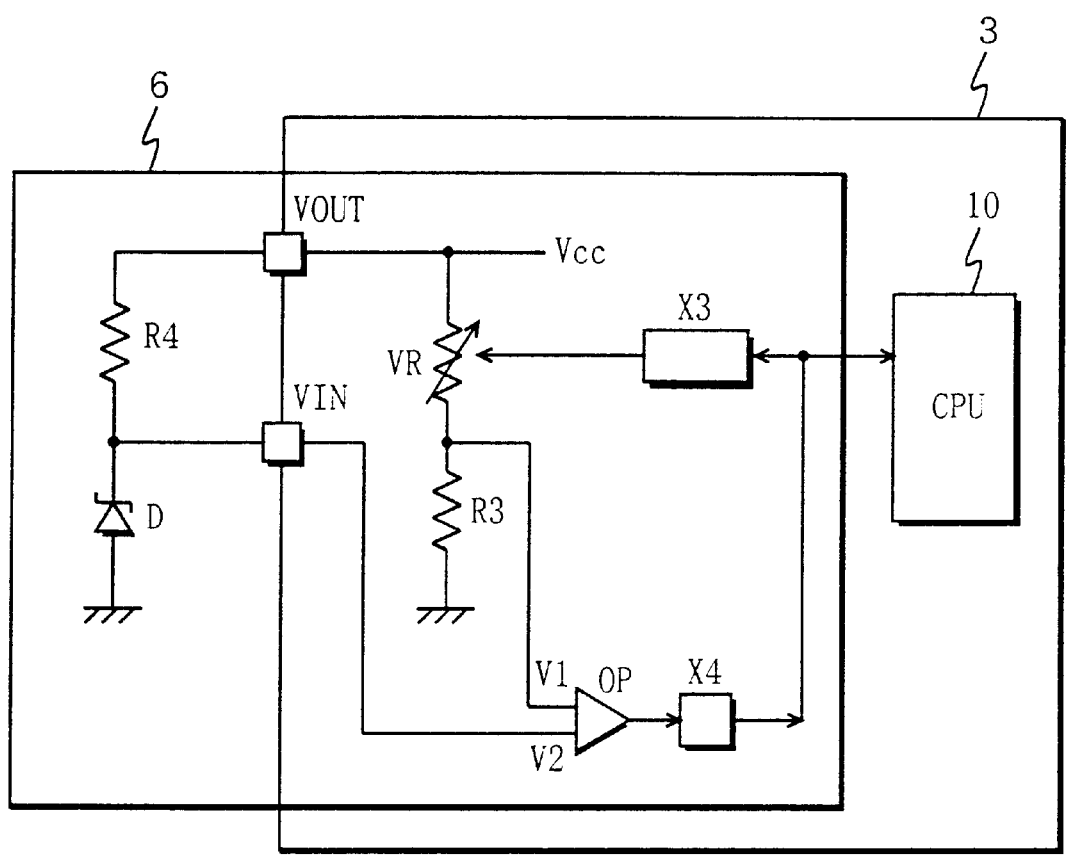
FIG. 7 is a circuitry diagram of a voltage detector in the portable game machine according to the embodiment of the present invention.
Figure 8:
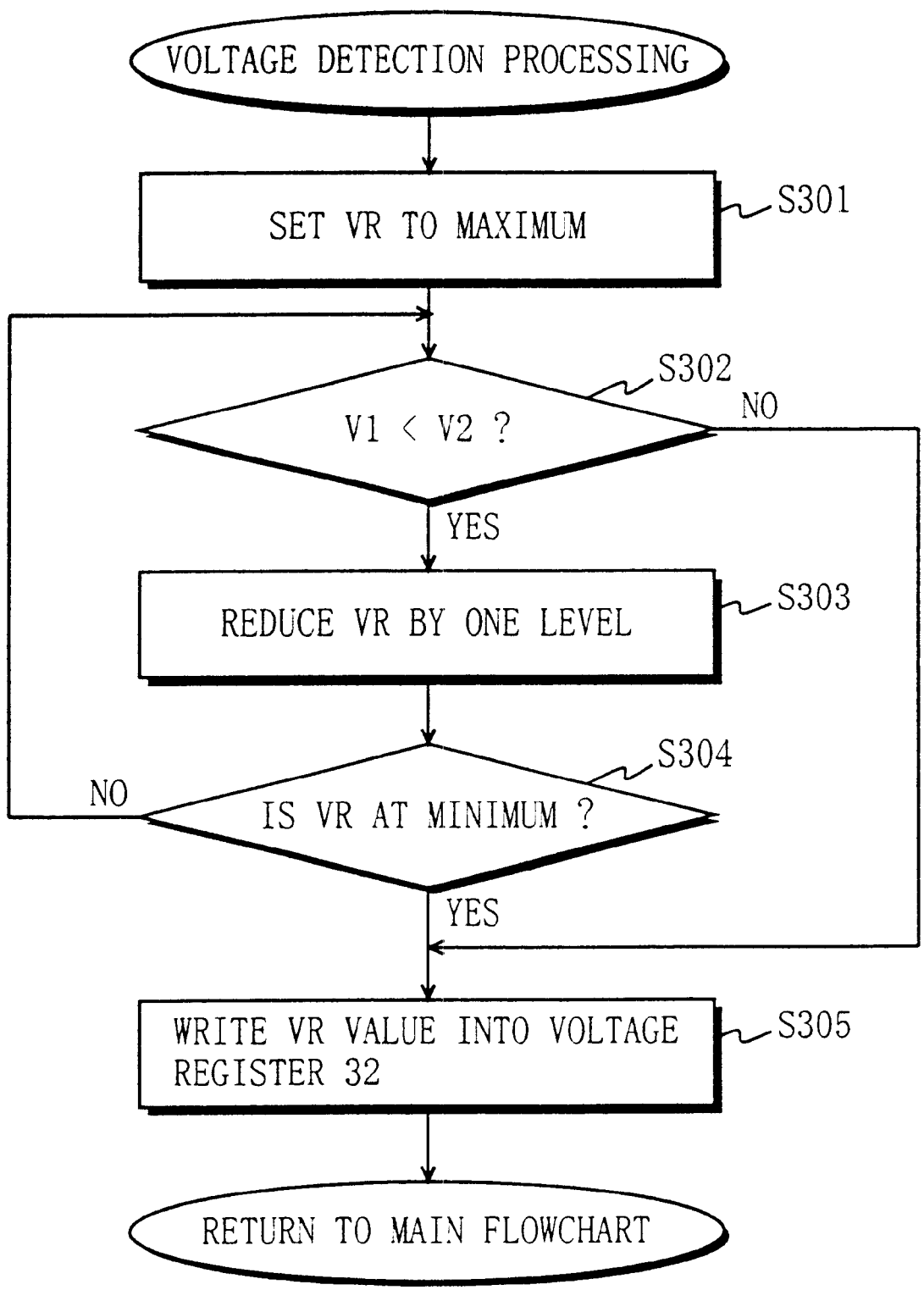
FIG. 8 is a flowchart of a voltage detection processing subroutine in the portable game machine according to the embodiment of the present invention.

Next, by referring to FIGS. 7 and 8, the voltage detection processing as being a second subroutine is described. FIG. 7 is a circuitry diagram showing the detail of the voltage detector 6 in the portable game machine 1 of the embodiment. The voltage detector 6 is structured by a resistor R4 and a zener diode D which are externally attached to the game machine IC 3, and a variable resistor VR, a resistor R3, and an operational amplifier OP which are provided internally in the game machine IC 3. The CPU 10 switches the resistance value of the variable resistor VR by setting a value in a register X3, and compares two input voltages V1 and V2 supplied to the operational amplifier OP by reading the value in a register X4. Such structure is for the CPU 10 to detect a power supply voltage Vcc supplied by the battery 2. The detail of the detection is described below.

FIG. 8 is a flowchart of the voltage detection processing subroutine in the portable game machine 1 of the present embodiment. The CPU 10 first sets the resistance value of the variable resistor R to the maximum value (step S301). Next, the CPU 10 compares two input voltages V1 and V2 supplied to the operational amplifier OP (step S302). When V1 is lower than V2, the CPU 10 reduces the resistance value of the variable resistor VR by a level as long as the resistance value of the variable resistor VR is not at the minimum (steps S303, S304). When the V1 is equal to or higher than the V2, the CPU 10 writes the resistance value of the variable resistor VR into the voltage register 32 (step S305). Note that the value in the voltage register 32 is not the voltage value itself but has one-to-one correspondence therewith.

Figure 9:
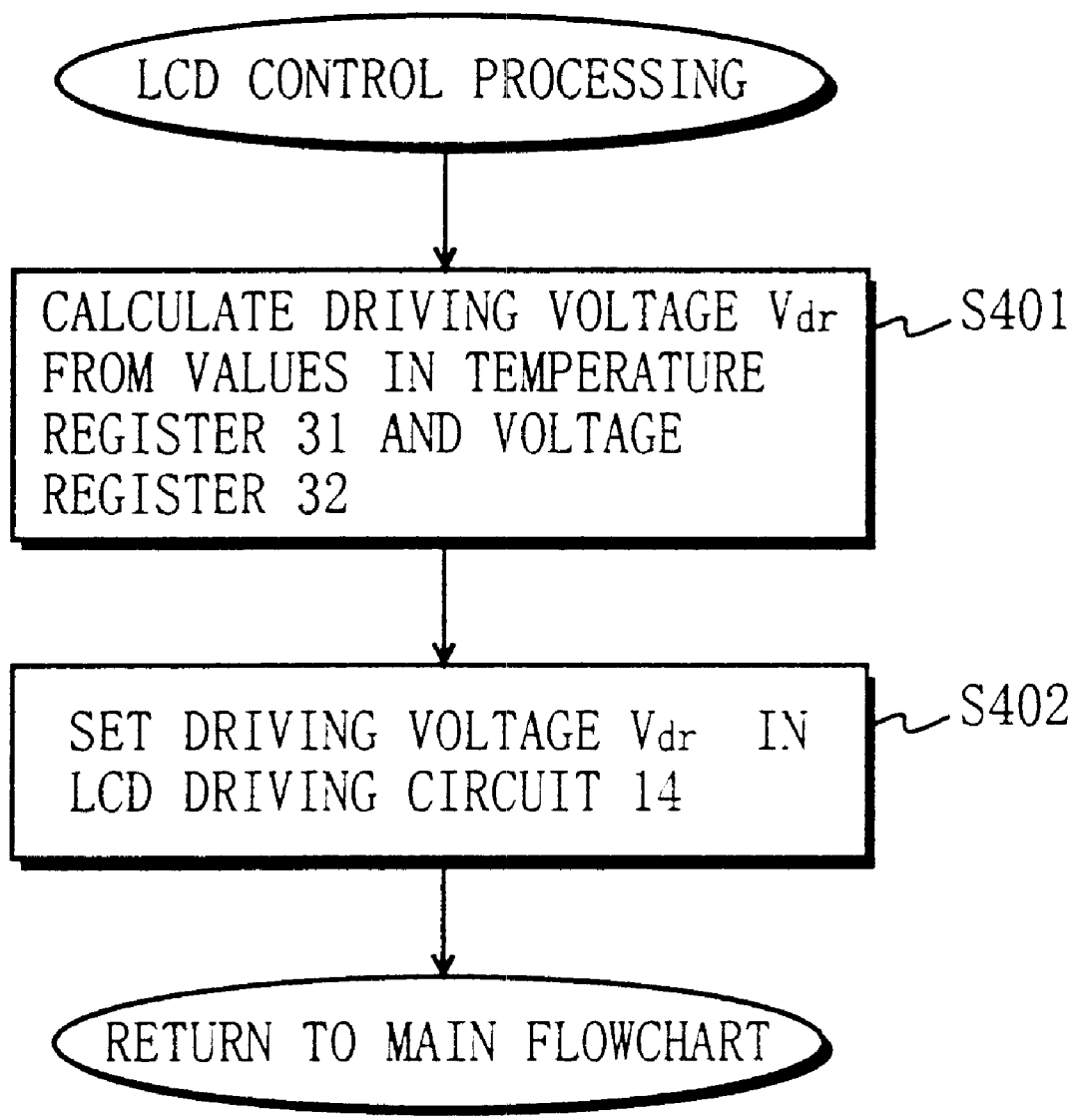
FIG. 9 is a flowchart of an LCD control processing subroutine in the portable game machine according to the embodiment of the present invention.

Next, by referring to FIGS. 9 and 10, the LCD control processing as being a third subroutine is described. FIG. 9 is a flowchart of the LCD control processing subroutine in the portable game machine 1 of the present embodiment. The CPU 10 calculates a driving voltage $V_{dr}$ for the LCD 4 from a value t in the temperature register 31 and a value v in the voltage register 32 (step S401), and then sets the calculated driving voltage $V_{dr}$ to the LCD driving circuit 14 (step S402).

Herein, in order to display a predetermined color on the LCD 4, the CPU 10 exemplarily calculates, in step S401, the driving voltage $V_{dr}$ in the following manner. FIG. 10 is the exemplary relation between temperatures/voltages and driving voltages for the LCD 4 in the portable game machine 1 according to the present embodiment. In FIG. 10, $T_{true}$ and $V_{true}$ indicate a true temperature value and a true voltage value, respectively, and t and v respectively indicate the detected temperature value detected by the temperature detector 5 and the detected voltage value detected by the voltage detector 6, and each of them has relation with $T_{true}$ and $V_{true}$. Further, each BIAS corresponds to an optimum driving voltage $V_{dr}$ under a certain condition of t and v. The relation between t, v and BIAS shown in FIG. 10 may be given by an approximate formula such as the equation (2) shown below. The CPU 10 calculates BIAS by substituting t and v into the equation (2) and sets the calculated BIAS to the LCD driving circuit 14.

$$BIAS = 65.545 - 0.240 \times t - 0.892 \times v \quad (2)$$

The LCD driving circuit 14 drives the LCD 4 with the optimum driving voltage $V_{dr}$ that corresponds to BIAS calculated by the CPU 10. Thereafter, based on the calculated driving voltage, the LCD driving circuit 14 controls each driver in the LCD driving circuit 14 to adjust the applied voltage on a part of character basis or a dot basis, thereby enabling display of the color set in the following step S106.

Note that the method for calculating the driving voltage $V_{dr}$ is not limited to the above. Alternatively, the CPU 10 may calculate BIAS, for example, by storing the table shown in FIG. 10 in the on-chip ROM 13 and then referring to the table in step S401.

Finally, the display image setting processing as being a fourth subroutine is described by referring to FIGS. 11a to 11c and FIG. 12. Based on the detected temperature value obtained by the temperature detection processing and the voltage value obtained by the voltage detection processing, the CPU 10 selects at least one character data item from among the plurality of character data items stored in the character data region 24.

Figures 11A, 11B, 11C:
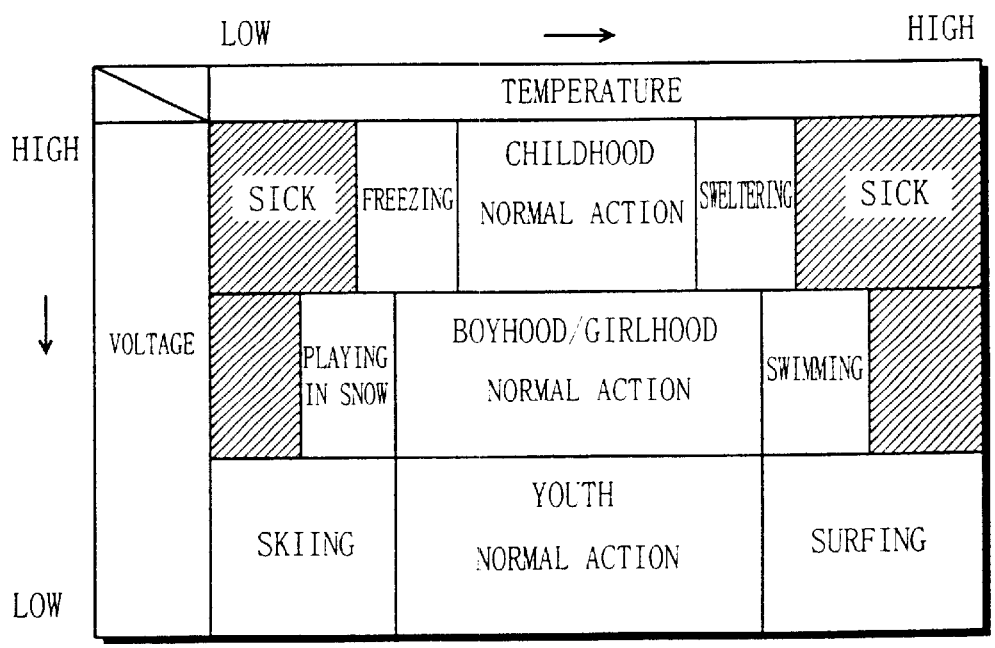
FIGS. 11a to 11c are diagrams showing a method for selecting a display image in the portable game machine according to the embodiment of the present invention.

FIGS. 11a to 11c are diagrams illustrating a method for selecting a display screen on the portable game machine 1 according to the embodiment of the present invention. The voltage value detected by the voltage detector 6 corresponds to an age of the character. For example, as shown in FIG. 11a, the character may be in any one of his/her childhood, boyhood/girlhood, or youth depending on the detected voltage value. Further, the temperature value detected by the temperature detector 5 corresponds to a character's action. For example, as shown in FIG. 11b, a plurality of actions are predetermined for each range of the detected temperature value, and the character performs the action selected from among the plurality of actions corresponding to the detected temperature value. In such selection, the action appropriate for the character's age is selected based on the detected temperature value and the detected voltage value. FIG. 11c is a diagram showing the selection of character's age and action determined by combinations of the detected temperature values and the detected voltage values. For example, when the detected temperature value is higher than 27 degrees centigrade, "sweltering", "swimming", or "surfing" is respectively selected for the character in his/her childhood, boyhood/girlhood, or youth.

Figure 12:
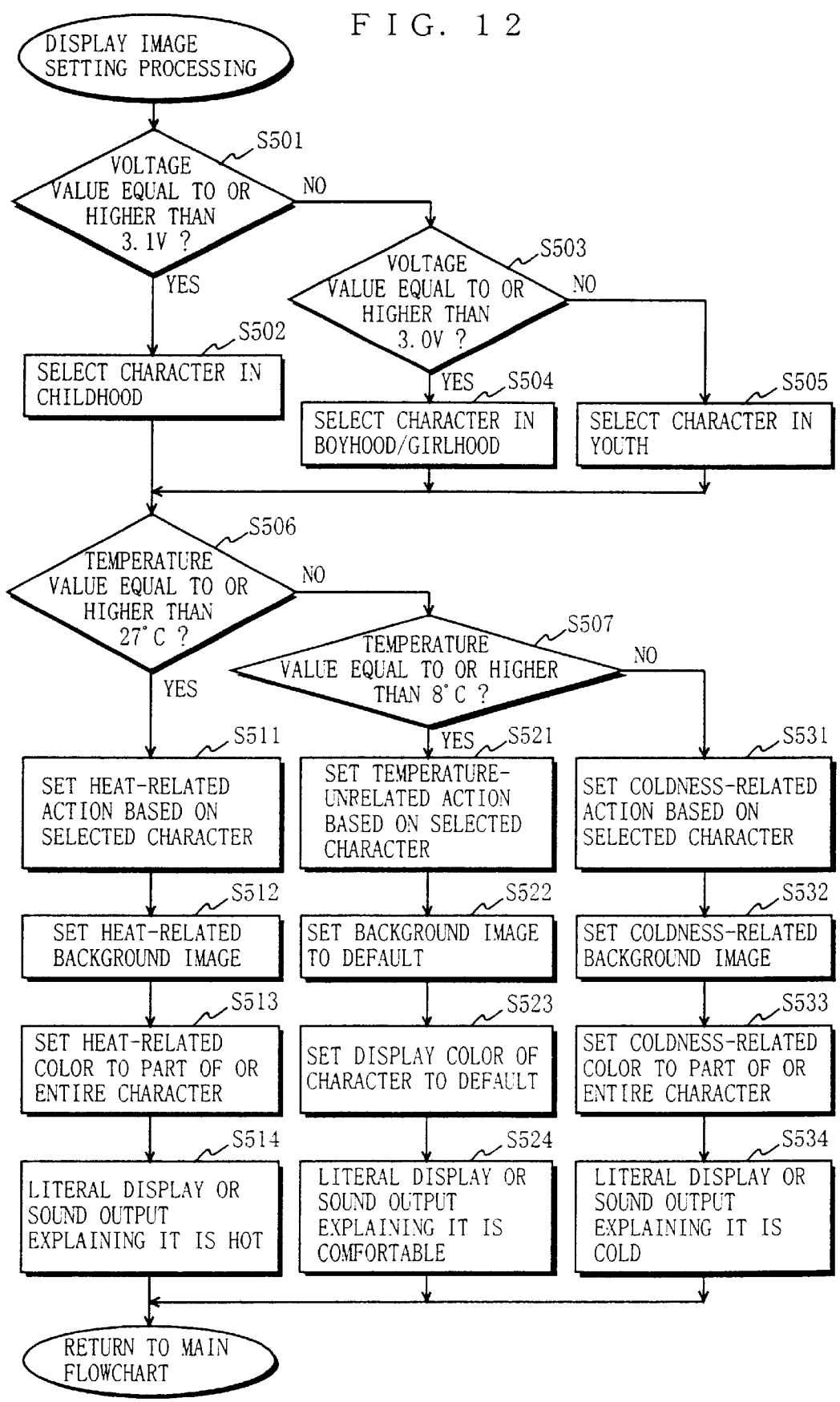
FIG. 12 is a flowchart of a display image setting processing subroutine in the portable game machine according to the embodiment of the present invention.

FIG. 12 is a flowchart of the display image setting subroutine in the portable game machine 1 according to the embodiment of the present invention. The CPU 10 first selects the age of the character with reference to the detected voltage value. In detail, the CPU 10 selects the character in his/her childhood when the voltage is equal to or higher than 3.1V (steps S501, S502), the character in his/her boyhood/girlhood when the voltage is equal to or higher than 3.0V and lower than 3.1V (steps S503, S504), and the character in his/her youth when the voltage is lower than 3.0V (step S505).

Next, the CPU 10 selects the character's action with reference to the detected temperature value. To be specific, the CPU 10 performs, when the temperature is equal to or higher than 27 degrees centigrade (step S506), processing for high-temperature (steps S511 to S514), when the temperature is equal to or higher than 8 degrees centigrade and lower than 27 degrees centigrade (step S507), processing for mid-temperature (steps S521 to S524), and when the temperature is lower than 8 degrees centigrade, processing for low-temperature (steps S531 to S543).

In the high-temperature processing, the CPU 10 first refers to FIG. 11c to select the action relevant to "the heat" appropriate for the selected age, and then sets the character data corresponding thereto in the display RAM 11 (step S511). The action of "sweltering", "swimming", or "surfing" is respectively selected for each case where the character is in his/her childhood, boyhood/girlhood, or youth. Next, the CPU 10 sets a background image representing "the heat" in the display RAM 11 (step S512). For example, a display of the sun. Thereafter, the CPU 10 sets the color of a part of or entire character to that representing "the heat" (step S513). For example, the color of the ears of the character displayed on the LCD 4 is set as red, which corresponds to "the heat" (step S514). Lastly, the CPU 10 displays text or outputs sound, indicating that it is hot (step S514). For example, the CPU 10 writes character data of a character string indicating "Isn't it hot today?" into the display RAM 11, and outputs the same sentence from the speaker 8 as sound. The CPU 10 similarly operates in the processing other than the high-temperature processing to write the selected character into the display RAM 11 based on the detected temperature value and the detected voltage value.

The LCD driving circuit 14 reads the character data written in the display RAM 11 and drives the LCD 4 at the driving voltage determined by the CPU 10. Thereby, the character selected based on the detected temperature value and the detected voltage value is displayed on the LCD 4. The display screens on the portable game machine 1 shown in FIGS. 3a to 3c are achieved by the above procedures. On the screens shown in FIGS. 3a to 3c, the characters corresponding to the normal action in childhood, the action when it is hot in boyhood/girlhood, and the action when it is cold in youth are respectively displayed.

As described in the foregoing, according to the portable game machine of the embodiment of the present invention, an operating temperature of the LCD and a power supply voltage are respectively detected by the temperature detector and the voltage detector and the LCD is driven by the driving voltage calculated based on the detected values. At the same time, at least one character data item is selected from among the plurality of character data items and the selected data item is displayed on the LCD 4. As a result of this, even in a case of adopting an LCD of Electrically Controlled Birefringence method having such characteristic that the display color changes depending on the operating temperature and the power supply voltage, screen display with a predetermined display color becomes possible by compensating the variations in temperature and voltage. Further, the display screen is switched based on the temperature and voltage, in other words, the temperature and voltage are reflected to the contents of games, thereby making the games more fun. Still further, as the character based on the temperature and voltage is displayed on the screen, a player can easily understand the status of the game machine.

In the present embodiment, the plurality of character data items are defined as image data showing the characters in ages corresponding to the voltage values, and performing actions corresponding to the temperature values. Therefore, the player is able to know the operating temperature of the LCD and the power supply voltage supplied by the battery from the character's age and action being displayed on the screen. Accordingly, the player is able to know, from the character's age, that the battery is almost exhausted, and is able to know, from the character's action corresponding either to the heat or to the coldness, the operating temperature of the LCD.

While the invention has been described in detail, the foregoing description is in all aspects illustrative and not restrictive. It is understood that numerous other modifications and variations can be devised without departing from the scope of the invention.

What is claimed is:

1. A portable game machine, comprising:
   an LCD for displaying a character data item;
   an LCD driver for driving said LCD;
   a temperature detector for detecting an operating temperature of said LCD;
   a voltage detector for detecting a voltage being supplied by a power supply of said portable game machine;
   program storage for storing a program;
   character data storage for storing the character data item; and
   a controller for calculating, based on a program stored in said program storage, a driving voltage in said LCD driver based on the temperature detected by said temperature detector and the voltage detected by said voltage detector, and adjusting said driving voltage so that at least a part of said character data item is displayed with a predetermined color.

2. The portable game machine as claimed in claim 1, wherein
   said character data item has predetermined colors on a dot-per-dot basis, and
   said controller controls, based on the detected temperature and the detected voltage, the driving voltage in said LCD driver so that each dot of said character data item is displayed with the predetermined color.

3. The portable game machine as claimed in claim 1, wherein
   said character data storage stores a plurality of character data items, and
   said controller selects, based on the detected temperature and the detected voltage, at least one character data item from among said plurality of character data items to display said selected character data item on said LCD.

4. The portable game machine as claimed in claim 3, wherein
   each of said plurality of character data items corresponds to at least one of a temperature value and a voltage value, and
   said controller selects the character data item based on at least one of the detected temperature and the detected voltage for display.

5. The portable game machine as claimed in claim 1, further comprising:
   a sound output system for outputting a sound data item; and
   sound data storage for storing a plurality of sound data items, wherein
   said controller selects, based on the detected temperature and the detected voltage, at least one sound data item from among said plurality of sound data items for output from said sound output system.

6. The portable game machine as claimed in claim 1, wherein said program storage, said character data storage and said sound data storage are detachable from said portable game machine.

7. A portable game machine, comprising:
   an LCD on which a display color varies depending on a temperature and a voltage;
   an LCD driver for driving said LCD;
   a temperature detector for detecting an operating temperature of said LCD;
   a voltage detector for detecting a voltage of a power supply of said portable game machine;
   character data storage for storing a character data item for a game display; and
   a controller for reading the character data item stored in said character data storage and controlling a driving voltage in said LCD driver based on the temperature detected by said temperature detector and the voltage detected by said voltage detector so that said character data item is displayed on said LCD with at least a part of said character data item changed by color.

8. The portable game machine as claimed in claim 7, wherein
   said plurality of character data items have predetermined colors on a dot-per-dot basis, and
   said controller controls, based on the detected temperature and the detected voltage, the driving voltage in said LCD driver so that each dot of said character data item is displayed with the predetermined color.

* * * * *